March 10, 1953     S. W. LANGDON     2,630,699
KING PIN LOCK FOR FREIGHT TRAILERS
Filed March 9, 1950
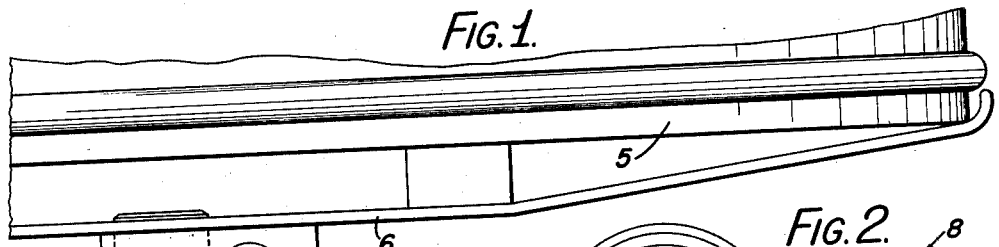
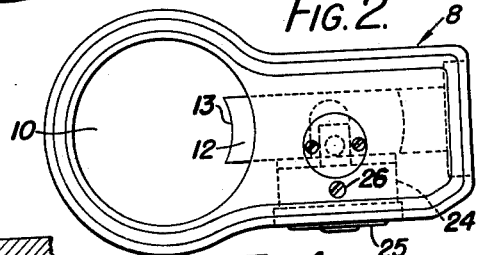
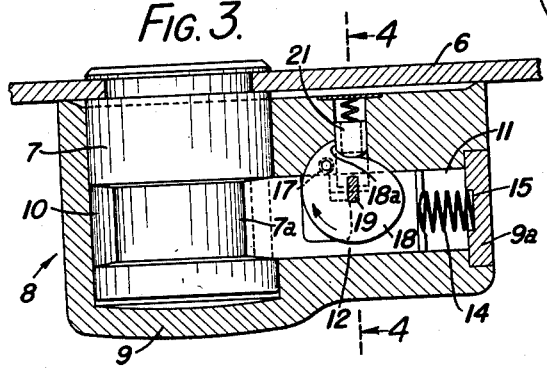
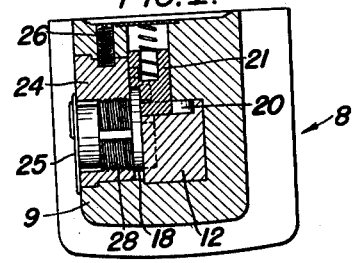
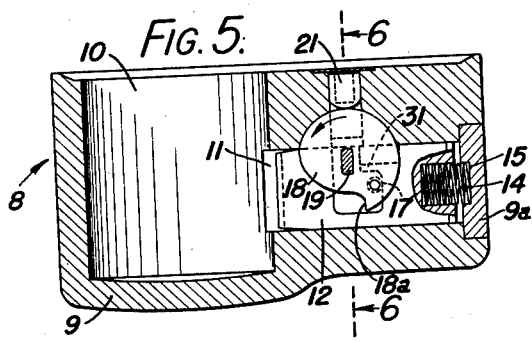
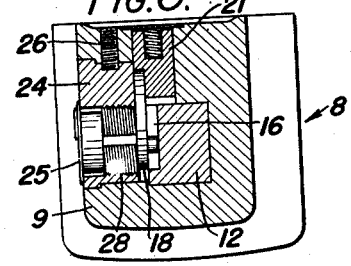
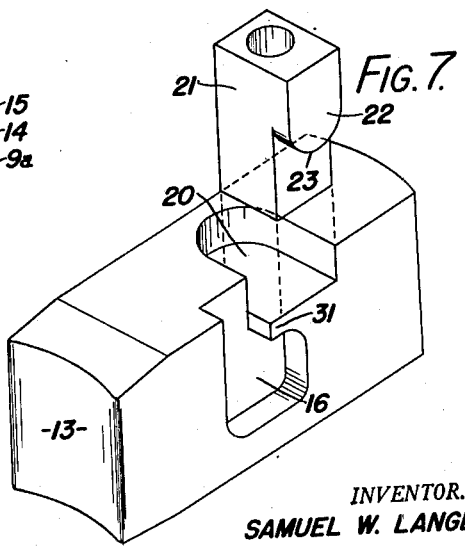
INVENTOR.
SAMUEL W. LANGDON
BY D. Clyde Jones
ATTORNEY Patented Mar. 10, 1953

2,630,699

UNITED STATES PATENT OFFICE 2,630,699

KING PIN LOCK FOR FREIGHT TRAILERS

Samuel W. Langdon, Rochester, N. Y., assignor to Stephen L. Morrow, Webster, N. Y.

Application March 9, 1950, Serial No. 148,690

1 Claim. (Cl. 70—232)

This invention relates to a king pin lock for the freight trailer of a tractor-trailer unit for use while the tractor is uncoupled from the trailer.

Loaded freight trailers are often left unguarded either while coupled to or while uncoupled from their tractors, with the result that many loaded trailers have been stolen. The contents of these trailers are usually of considerable value so that such thefts represent high losses to the truck operators. While the tractor itself can be locked, the trailer can be readily disconnected therefrom and can be quickly coupled to another tractor, supplied by the thief, who can then drive away with the stolen trailer. If the loaded trailer has been previously disconnected from its tractor, by the owner, the thief merely needs to back his tractor into coupling relation with the king pin of the loaded trailer and then drive it away.

The present invention has for its purpose a novel trailer lock so constructed that it cannot be readily burned away by a torch and cannot be quickly broken or disengaged by hammering or prying.

The various features and advantages of the invention will appear from the detailed description and claim when taken with the drawings in which:

Fig. 1 is a fragmentary side view of the front portion of a tractor-drawn freight trailer showing especially the conventional upper fifth wheel plate and the downwardly projecting king pin, with the lock of the present invention applied thereto;

Fig. 2 is a top view of the present lock with the bolt thereof in its locking position;

Fig. 3 is a section taken lengthwise on Fig. 2 particularly illustrating the king pin of the trailer having the lock thereon with the bolt of the lock in its locking position;

Fig 4 is a transverse section taken substantially on the line 4—4 of Fig. 3;

Fig. 5 is a view similar to that shown in Fig. 3 except that the king pin has been omitted and the bolt is shown in its unlocked position;

Fig. 6 is a cross-section taken substantially on the line 6—6 of Fig. 5; and

Fig. 7 is an exploded perspective view of the bolt lock and its latch which retains the bolt in its locking position.

Referring first to Fig. 1, the numeral 5 designates the fragmentary front end portion of a freight trailer having the usual upper fifth wheel plate 6 with its conventional, grooved king pin 7 projecting downward therefrom so that the trailer can be coupled to a tractor (not shown). In this figure, the lock 8 of the present invention is shown fastened to and completely enclosing the king pin 7 so that the trailer cannot be coupled to a tractor without removing the lock.

The lock comprises a hardened steel shell 9 which may be made in any well-known manner such as by casting the shell in two or more parts for easy internal machining and then welding these parts into an integral shell having the contours indicated in Figs. 1 and 2. As shown in Figs. 3 and 5, the right end of the casing is illustrated as having a heavy steel disc 9a welded thereto. This disc fills an opening through which a part of the interior of the casing was machined. This casing has a vertical cylindrical cavity 10 in the left end (Fig. 2) thereof to receive the king pin 7 as shown in Fig. 3. The right end of this casing has a longitudinally extending rectangular guideway 11 which communicates with the cylindrical cavity. This guideway receives the rectangular bolt 12 of the lock with a sliding fit for travel to and from the locking position (Figs. 3 and 5). It will be noted in Fig. 7 that the left end portion of the bolt has beveled upper and lower surfaces and a vertically extending reentrant concave surface 13 to conform to and enter the notch 7a in the king pin. A coil spring 14 having its ends respectively retained in a bore in the right end of the bolt and in the bore 15 in the casing, tends to move the bolt to its locking position as shown in Fig. 3, unless the bolt is otherwise retained in its unlocked position as shown in Fig. 5.

The side of the bolt has a cam-shaped recess 16 provided therein to be engaged by a pin 17. This pin is carried by the cam 18 secured on the end of the cylinder 19 of a conventional cylinder lock, for moving the bolt 12 forward and backward. The top of the bolt has a latch recess 20 cut therein to receive the lower end of a generally rectangular latch 21 which insures that the bolt cannot be jarred from its locking position by hammering on the casing. This latch has a lateral projection 22 with a rounded lower end 23 to be engaged by the periphery of the cam 18. A spring biases the latch downward so that the rounded end 23 is held in engagement with the cam at all times.

The casing is provided with a lateral circular bore which communicates with the guideway 11. This bore is closed by a circular hardened steel plug 24 in which there is secured a conventional cylinder lock 25 arranged to move the bolt 12 between its unlocked and its locked position. This plug has a counter-bore in its circular surface to receive a set screw 26 accessible only from the top of the lock. It will be noted that when the lock is in its locking position on the king pin (Fig. 1) the top of the lock engages the under surface of the top fifth wheel plate so that the set screw is not accessible.

The plug 24 has a threaded bore extending therethrough, into which the barrel 28 of a conventional cylinder lock, can be screwed with the inner end of the cylinder 19 of the cylinder lock extending slightly beyond the inner surface of the plug. The inner end of the cylinder has mounted thereon the mentioned cam 18 having on its face the previous mentioned pin 17 which travels in the cam-shaped recess 16 in the bolt, to move the bolt lengthwise in either direction. The periphery of the cam 18 engages the rounded lower end 23 on the latch projection 22. Thus the cam 18 raises the latch 21 from the latch recess 20 before the bolt 12 is moved by means of the pin 17 to its unlocked position and lowers the spring biassed latch 21 into the latch recess in the top of the bolt after the bolt is similarly moved into its locking position.

It should be pointed out that as the key (not shown) of the cylinder lock is turned in a clockwise direction, the cam 18 with its projecting pin 17 is also rotated in a like direction from substantially the position shown in Fig. 5 to the position shown in Fig. 3. As the cam rotates, its periphery starts to lower the latch 21 toward the latch recess 20 and the pin 17 is carried by the cam, toward the left side of the cam recess 16. As the pin 17 rotates further in this direction, it engages the left side of the cam recess 16 to force the bolt to its full locking position (Fig. 3), the coil spring 15 assisting in this movement of the bolt. The key continues to rotate the cam 18 until shoulder 18a thereon engages the left side of the latch 21 (Fig. 3) to stop further movement of the cam in the mentioned direction. At this time the pin 17 is outside of the cam recess 16 and the latch 21 is fully lowered into the latch recess 20 so that the bolt cannot be dislodged from its locking position unless the cylinder lock is unlocked.

When it is desired to remove the trailer lock from the king pin, the key is inserted in the cylinder lock and is turned in a counter-clockwise direction. This rotates the cam 18 and its projecting pin 17 in a like direction. As the cam 18 rotates, it raises the latch 21 free of the latch recess 20, so that the bolt 12 can be moved to the right when the pin 17 engages the vertical right side of the cam recess 16 to the position shown in Fig. 5. The further counter-clockwise rotation of the cam 18 and the pin 17 is stopped when pin 17 hits the shoulder 31 (Fig. 7) on the bolt.

In accordance with this invention, the lock preferably encloses the king pin completely but by way of modification the bottom of cavity 10 can also be left open so that the lock only encircles the king pin.

From the foregoing it will be seen that the present invention provides a trailer lock which is compact, which is easily applied to the king pin of the trailer and which affords a high degree of security against unauthorized removal.

While a preferred form of the present lock has been disclosed, it will be understood that there can be many modifications and variations therein, within the scope of the appended claim, without departing from the spirit of the present invention.

What I claim is:

A lock for the notched king pin which projects downward from the upper fifth wheel plate of a freight trailer, said lock comprising a casing having a portion enclosing the king pin about the notch therein, a bolt movable in said casing into and out of locking engagement with said notch, a latch for retaining said bolt in locking engagement with said notch, said latch having a projection thereon, said bolt having a cam recess therein and a latch recess therein, a cylinder lock secured in the casing and accessible for key operation from the outside thereof, said cylinder lock being provided with a key-operated rotatable cylinder, a cam on said cylinder for rotation therewith, said cam serving to move said latch into and out of engagement with said latch recess, and a pin on said cam engaging said cam recess to advance said bolt in engagement with the notch in said king pin and out of engagement therewith in coordinate relation with the lowering into and the raising respectively of the latch from the recess.

SAMUEL W. LANGDON.

REFERENCES CITED

The following references are of record in the file of this patent:

UNITED STATES PATENTS

| Number | Name | Date |
|---|---|---|
| 1,309,918 | Terracciano | July 5, 1919 |
| 1,530,521 | Robinson | Mar. 24, 1925 |
| 1,594,450 | Calabrese | Aug. 3, 1926 |
| 2,440,744 | Grinnell et al. | May 4, 1948 |